United States Patent
Whitehead

(10) Patent No.: US 7,104,663 B2
(45) Date of Patent: *Sep. 12, 2006

(54) MEMORY MIRROR SYSTEM FOR VEHICLE

(75) Inventor: Peter J. Whitehead, Holland, MI (US)

(73) Assignee: Donnelly Corporation, Holland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/790,309

(22) Filed: Mar. 1, 2004

(65) Prior Publication Data

US 2004/0165293 A1    Aug. 26, 2004

Related U.S. Application Data

(62) Division of application No. 09/572,008, filed on May 16, 2000, now Pat. No. 6,698,905.

(51) Int. Cl.
*G02B 5/08* (2006.01)
*G02B 7/182* (2006.01)
*B60R 1/04* (2006.01)

(52) U.S. Cl. ............... 359/872; 359/877; 359/843; 359/604; 248/549; 248/480; 248/481; 248/484

(58) Field of Classification Search ............ 359/604, 359/605, 606, 843, 872, 877, 265, 267, 873; 248/549, 480, 481, 484
See application file for complete search history.

(56) References Cited

U.S. PATENT DOCUMENTS

| | | | |
|---|---|---|---|
| 1,913,874 A | 6/1933 | Folberth et al. | 359/604 |
| 3,059,539 A | 10/1962 | Meade | 359/606 |
| 3,152,216 A | 10/1964 | Woodward | 359/606 |
| 4,088,398 A | 5/1978 | Zoursel | 359/605 |
| 4,281,898 A | 8/1981 | Ochiai et al. | 359/606 |
| 4,359,263 A * | 11/1982 | Zeigler et al. | 359/606 |
| 4,435,042 A * | 3/1984 | Wood et al. | 359/606 |
| 4,443,057 A | 4/1984 | Bauer et al. | 359/877 |
| 4,448,488 A | 5/1984 | Nakaho | 359/606 |
| 4,451,887 A | 5/1984 | Harada et al. | 364/424 |
| 4,524,941 A * | 6/1985 | Wood et al. | 248/544 |
| 4,593,878 A * | 6/1986 | Stewart | 248/549 |
| 4,698,571 A | 10/1987 | Mizuta et al. | 318/568 |
| 4,707,788 A | 11/1987 | Tashiro et al. | 364/424 |
| 4,781,436 A | 11/1988 | Armbruster | |
| 4,793,690 A | 12/1988 | Gahan et al. | 350/279 |

(Continued)

FOREIGN PATENT DOCUMENTS

CA    0734698    5/1966

(Continued)

OTHER PUBLICATIONS

Industry Standard SAE J1708 Oct. 93 entitled "Serial Data Communications Between Microcomputer Systems in Heavy-Duty Vehicle Applications."

(Continued)

*Primary Examiner*—Ricky D. Shafer
(74) *Attorney, Agent, or Firm*—Van Dyke, Gardner, Linn & Burkhart, LLP

(57) ABSTRACT

A vehicle memory mirror system of the present invention includes an interior rearview mirror assembly. The mirror assembly includes a mirror casing, with a reflective element, and a support, which is adapted to mount the mirror assembly to a vehicle. An electrical actuator is located interiorly of the mirror casing and is adapted to adjust the orientation of the reflective element to adjust the rearward field of view of the reflective element.

26 Claims, 4 Drawing Sheets

U.S. PATENT DOCUMENTS

| | | | |
|---|---|---|---|
| 4,811,226 A | 3/1989 | Shinohara | 364/424.05 |
| 4,826,289 A * | 5/1989 | Vandenbrink et al. | 359/606 |
| 4,871,953 A | 10/1989 | Anstee | 318/466 |
| 4,882,565 A | 11/1989 | Gallmeyer | |
| 4,883,974 A | 11/1989 | Tinder | 307/10.1 |
| 4,936,671 A | 6/1990 | Kaspar | 350/637 |
| 4,940,322 A | 7/1990 | Hamamoto et al. | 350/637 |
| 4,948,242 A | 8/1990 | Desmond et al. | |
| 5,016,996 A * | 5/1991 | Ueno | 359/838 |
| 5,019,759 A | 5/1991 | Takemura et al. | 318/466 |
| 5,033,835 A | 7/1991 | Platzer, Jr. | |
| 5,193,029 A | 3/1993 | Schofield et al. | 359/604 |
| 5,196,965 A | 3/1993 | Lang et al. | 359/841 |
| 5,330,149 A * | 7/1994 | Haan et al. | 248/549 |
| 5,424,898 A | 6/1995 | Larson et al. | 361/101 |
| 5,479,155 A | 12/1995 | Zeinstra et al. | 340/825.22 |
| 5,572,354 A | 11/1996 | Desmond et al. | 359/265 |
| 5,576,687 A | 11/1996 | Blank et al. | 340/438 |
| 5,615,857 A | 4/1997 | Hook | 248/549 |
| 5,671,996 A | 9/1997 | Bos et al. | |
| 5,694,259 A | 12/1997 | Brandin | 359/843 |
| 5,706,144 A | 1/1998 | Brandin | 359/843 |
| 5,708,410 A | 1/1998 | Blank et al. | 340/438 |
| 5,796,176 A | 8/1998 | Kramer et al. | 307/10.1 |
| 5,798,575 A | 8/1998 | O'Farrell et al. | 307/10.1 |
| 5,820,097 A * | 10/1998 | Spooner | 248/549 |
| 5,959,367 A | 9/1999 | O'Farrell et al. | |
| 5,969,870 A | 10/1999 | Jain et al. | 359/606 |
| 5,984,482 A * | 11/1999 | Rumsey et al. | 359/871 |
| 6,042,253 A | 3/2000 | Fant, Jr. et al. | 362/494 |
| 6,087,953 A | 7/2000 | DeLine et al. | 340/815.4 |
| 6,152,590 A | 11/2000 | Furst et al. | |
| 6,329,925 B1 | 12/2001 | Skiver et al. | |
| 6,698,905 B1 * | 3/2004 | Whitehead | 359/872 |

FOREIGN PATENT DOCUMENTS

| | | |
|---|---|---|
| DE | 3437775 | 4/1986 |
| DE | 4241543 | 6/1993 |
| EP | 0208445 | 1/1987 |
| EP | 0274848 A1 | 7/1988 |
| EP | 0294791 A2 | 12/1988 |
| EP | 0433531 A1 | 6/1991 |
| GB | 2029343 | 3/1980 |
| GB | 2090017 A | 6/1982 |
| GB | 2315136 A | 1/1998 |
| JP | 57209436 | 12/1982 |
| JP | 0084641 | 5/1984 |
| WO | WO 9605080 | 2/1996 |
| WO | WO 9616838 A1 | 6/1996 |

OTHER PUBLICATIONS

Article entitled "Electronics Create the Cybercar," *Design News*, Oct. 9, 1995.

* cited by examiner

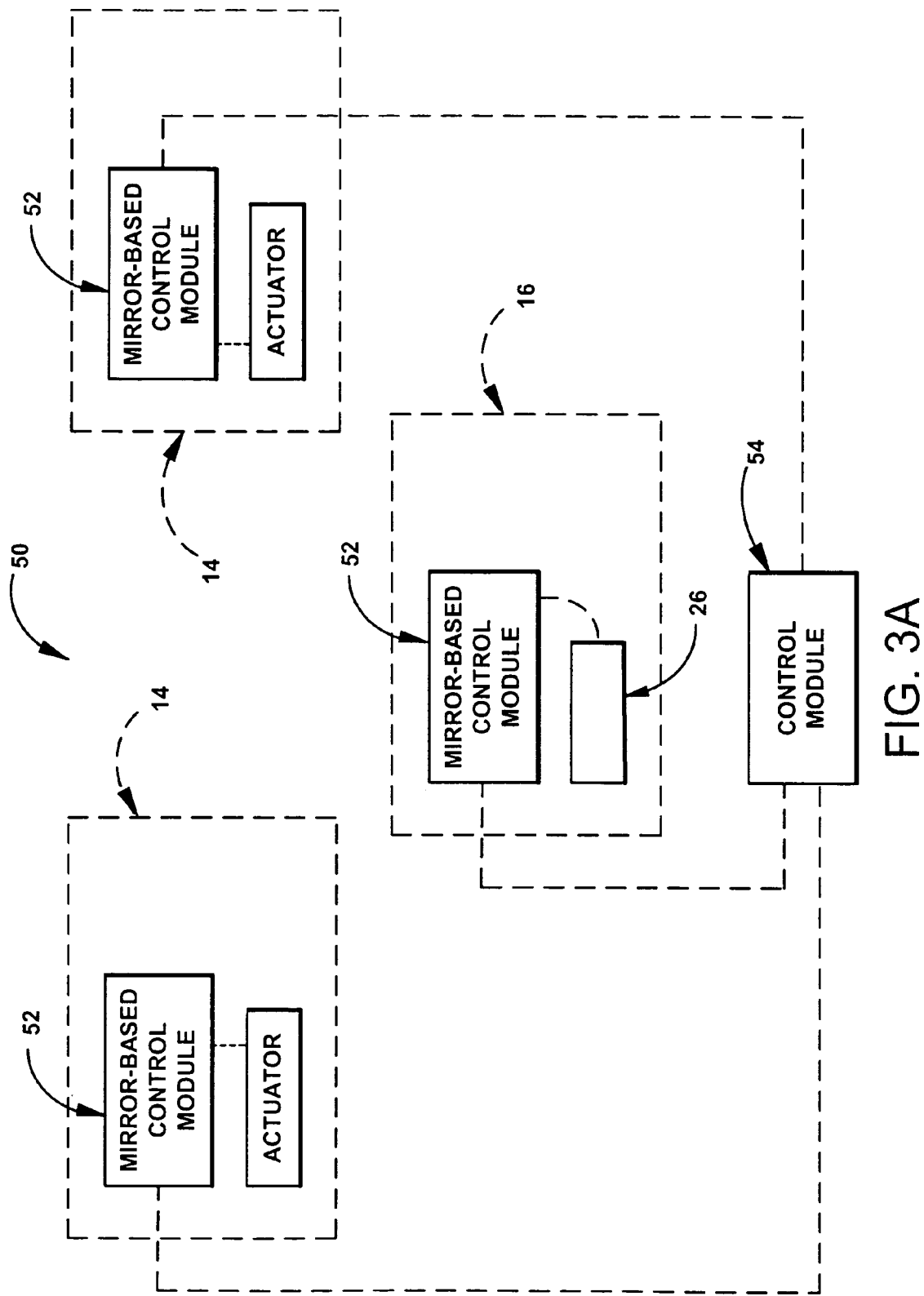

MEMORY MIRROR SYSTEM FOR VEHICLE

This application is a divisional application of U.S. patent application Ser. No. 09/572,008, filed May 16, 2000, now U.S. Pat. No. 6,698,905, which is incorporated herein in its entirety.

TECHNICAL FIELD AND BACKGROUND OF THE INVENTION

The present invention generally relates to an interior rearview mirror assembly and, more particularly, to an interior rearview mirror assembly for a vehicle memory mirror system.

Conventional vehicle memory mirror systems typically include one or more exterior mirror assemblies which are equipped with electrically operated motors that provide for repositioning of the mirror assemblies' reflective elements with respect to one or more axes. Particularly for exterior sideview mirrors, it is known to incorporate memory-positioning systems so that a driver of a vehicle may select a desired position of the exterior sideview mirror by simply pushing a button. Less known, but currently available, are memory mirror systems, which include memory positions not only for the exterior sideview mirror assemblies but further, for the interior rearview mirror assembly. Incorporated into each of these mirror assemblies is a drive mechanism, which provides for the memory positions for each of the reflective elements in the mirror assemblies.

Referring to FIG. 6, a conventional interior mirror assembly for a memory mirror system includes a housing with a pivotal portion, such as a casing C, and a fixed portion, such as a mounting arm M, which mounts the casing to a windshield W on, for example a mounting button, as is known in the art. A reflective element assembly R is supported in the pivotal portion or casing by an electrical actuator A. Heretofore, the actuator or drive mechanisms that have been incorporated into these interior rearview mirror assemblies necessarily add weight to the pivotal portion and, further, result in crowding out of other accessories or features which may be incorporated into the interior rearview mirror casing. While such memory mirror systems (which include both exterior and rearview mirror assemblies) are known, they are not widely used. It has been found that the weight of the motor, especially in interior mirror assemblies, has impacted the vibration performance of the mirror assembly. In addition, as the interior rearview mirror assembly has been more recently targeted as a location for storing or holding a multitude of electronic and electrical devices and accessories the space in the interior mirror assembly casing has become more coveted.

For example, interior mirror assemblies now incorporate map lights, displays, videos, and other utility functions, such as described in copending U.S. patent application entitled REARVIEW MIRROR ASSEMBLY WITH UTILITY FUNCTIONS, Ser. No. 09/449,121, filed Nov. 24, 1999, now U.S. Pat. No. 6,428,172, the disclosure of which is herein incorporated by reference in its entirety. Other examples of the various electronic and electrical features now incorporated into interior rearview mirror assemblies include: Video screens, such as disclosed in copending U.S. patent application entitled INTERIOR REARVIEW MIRROR ASSEMBLY INCORPORATING A VIDEO SCREEN, filed Mar. 1, 2000, Ser. No. 60/186,520; microphones and/or speakers, such as disclosed in U.S. patent applications Ser. No. 09/361,814, filed Jul. 27, 1999, now U.S. Pat. No. 6,201,642, and Ser. No. 09/199,907 filed Nov. 25, 1998; sound processing systems, including digital sound processing systems, such as disclosed in U.S. pending application entitled INTERIOR REARVIEW MIRROR SOUND PROCESSING, Ser. No. 09/466,010, filed Dec. 17, 1999, now U.S. Pat. No. 6,420,975, all of which are incorporated by reference herein in their entireties. Examples of location of such displays and/or user interfaces and/or other accessories such as video screens are disclosed in copending U.S. patent applications entitled INTERIOR REARVIEW MIRROR ASSEMBLY INCORPORATING A VIDEO SCREEN, filed Mar. 1, 2000, Ser. No. 60/186,520; U.S. patent applications Ser. No. 09/361,814, filed Jul. 27, 1999, now U.S. Pat. No. 6,201,642, and 09/199,907, filed Nov. 25, 1998; such as sound processing systems, including digital sound processing systems, are disclosed in U.S. Pat. No. 4,959,865 entitled A METHOD FOR INDICATING THE PRESENCE OF SPEECH IN AN AUDIO SIGNAL, issued Sep. 25, 1990, to Stettiner et al. and in co-pending and co-assigned U.S. patent applications Ser. No. 09/466,010, filed Dec. 17, 1999, now U.S. Pat. No. 6,420,975; Ser. No. 09/396,179, filed Sep. 14, 1999, now U.S. Pat. No. 6,420,975; Ser. No. 09/382,720, filed Aug. 25, 1999, now U.S. Pat. No. 6,243,003; Ser. No. 09/449,121, filed Nov. 24, 1999, now U.S. Pat. No. 6,428,172; Ser. No. 09/433,467, filed Nov. 4, 1999, now U.S. Pat. No. 6,326,613; and Ser. No. 09/448,700, filed Nov. 24, 1999, now U.S. Pat. No. 6,329,925; such as displays, including tire pressure sensor system displays, compass sensors and displays, temperature displays, are disclosed in U.S. patent application Ser. No. 09/244,726, filed Feb. 5, 1999, now U.S. Pat. No. 6,172,613, and in U.S. patent application entitled REARVIEW MIRROR ASSEMBLY WITH UTILITY FUNCTIONS, Ser. No. 09/449,121, filed Nov. 24, 1999, now U.S. Pat. No. 6,428,172; and U.S. Pat. No. 5,530,240; such as a communication module is disclosed in U.S. Pat. No. 5,798,688; such as blind spot detection systems are disclosed in U.S. Pat. Nos. 5,929,786 or 5,786,772; such as transmitters and/or receivers, including garage door openers and a digital network, are described in U.S. Pat. No. 5,798,575; such as a memory mirror system is disclosed in U.S. Pat. No. 5,796,176; U.S. Pat. No. 5,798,575; U.S. Pat. No. 5,812,321; U.S. Pat. No. 5,786,772; and U.S. Pat. No. 5,959,367, and in U.S. patent applications entitled MEMORY MIRROR SYSTEM FOR VEHICLES, Ser. No. 09/448,690, filed Nov. 24, 1999, now U.S. Pat. No. 6,163,083; and A VEHICLE REARVIEW MIRROR AND A VEHICLE CONTROL SYSTEM INCORPORATING SUCH MIRROR, Ser. No. 09/341,450, filed Jul. 8, 1999, now U.S. Pat. No. 6,291,905; such as a hands-free phone attachment, a video device for internal cabin surveillance and/or video telephone function, are disclosed in U.S. Pat. Nos. 5,760,962 and 5,877,897 and U.S. patent application Ser. No. 09/433,467, now U.S. Pat. No. 6,326,613, and U.S. patent application Ser. No. 08/918,772, entitled MODULAR REARVIEW MIRROR ASSEMBLY, filed Aug. 25, 1997, now U.S. Pat. No. 6,124,886; such as vehicle navigation systems are described in co-pending provisional application Ser. No. 60/131,593, filed Apr. 29, 1999, entitled VEHICLE-BASED NAVIGATION SYSTEM WITH SMART MAP FILTERING, PORTABLE UNIT HOME-BASE REGISTRATION AND MULTIPLE NAVIGATION SYSTEM PREFERENTIAL USE; such as map lights, including maps lights incorporating light emitting diodes (including organic light emitting diodes) generating a white light beam, are disclosed in U.S. Pat. Nos. 5,938,321; 5,813,745; 5,820,245; 5,673,994; 5,649,756; 5,178,448; 5,669,698; 5,671,996; 4,733,336; and 4,646,210; such as microphones and/or speakers are disclosed in U.S. patent applications Ser. No. 09/361,814, filed Jul. 27, 1999, now U.S. Pat. No. 6,201,642, and Ser. No. 09/199,907, filed Nov. 25, 1998; such as a compass is disclosed in U.S. Pat. No. 5,924,212; such as GPS displays and systems are disclosed in U.S. Pat. No. 5,971,552 and pending U.S. patent applications entitled COMPLETE MIRROR-BASED GLOBAL-POSITIONING SYSTEM (GPS) NAVIGATION SOLUTION, filed Mar. 9, 2000, Ser. No. 60/187,960, and entitled VEHICLE-BASED NAVIGATION SYSTEM WITH SMART MAP FILTERING, HANDHELD UNIT HOME-BASE REGISTRATION AND MULTIPLE NAVIGATION SYSTEM PREFERENTIAL USE, Ser. No. 60/131,593, filed Apr. 29, 1999; such as cameras, including video cameras, are disclosed in U.S. Pat. Nos. 5,877,897; 5,760,962; 5,959,367; 5,929,786; 5,949,331; 5,914,815; 5,786,772; 5,798,575; and 5,670,935, and pending U.S. patent applications entitled VEHICLE REARVIEW MIRROR DISPLAY SYSTEM, Ser. No. 09/304,201, filed May 3, 1999; VEHICLE MIRROR DIGITAL NETWORK AND DYNAMICALLY INTERACTIVE MIRROR SYSTEM, Ser. No. 09/375,315, filed Aug. 16, 1999, now U.S. Pat. No. 6,198,409; WIDE ANGLE IMAGE CAPTURE SYSTEM FOR VEHICLES, Ser. No. 09/199,907, filed Nov. 25, 1998; WIDE ANGLE IMAGING SYSTEM, Ser. No. 09/361,814, filed Jul. 27, 1999, now U.S. Pat. No. 6,201,642; VEHICLE IMAGING SYSTEM WITH STEREO IMAGING, Ser. No. 09/372,915, filed Aug. 12, 1999, now U.S. Pat. No. 6,396,397; VEHICLE REARVIEW MIRROR DISPLAY SYSTEM, Ser. No. 09/300,201, filed May 3, 1999; REARVIEW VISION SYSTEM WITH INDICIA OF BACKUP TRAVEL, Ser. No. 09/313,139, filed May 17, 1999, now U.S. Pat. No. 6,222,447; and pending U.S. patent applications Ser. No. 09/361,814, filed Jul. 27, 1999, now U.S. Pat. No. 6,201,642, and Ser. No. 09/199,907, filed Nov. 25, 1998, and U.S. patent application Ser. No. 09/433,467 filed Nov. 4, 1999, entitled VEHICLE INTERIOR MIRROR ASSEMBLY, to Patrick Heslin and Niall R. Lynam, now U.S. Pat. No. 6,326,613; such as headlamp controllers are disclosed in pending U.S. patent application entitled VEHICLE HEADLIGHT CONTROL USING IMAGING SENSOR, Ser. No. 09/441,341, filed Nov. 16, 1999; such as telematic interfaces are disclosed in co-pending U.S. patent application Ser. No. 08/918,772, entitled MODULAR REARVIEW MIRROR ASSEMBLY, filed Aug. 25, 1997, now U.S. Pat. No. 6,124,886; storage and pendant accessories disclosed in U.S. patent application entitled REARVIEW MIRROR ASSEMBLY WITH UTILITY FUNCTIONS, Ser. No. 09/449,121, filed Nov. 24, 1999, now U.S. Pat. No. 6,428,172; such as rain sensors, including non-contacting rain sensors, are disclosed U.S. Pat. No. 4,973,844 entitled VEHICULAR MOISTURE SENSOR AND MOUNTING APPARATUS THEREFORE, and PCT International Application PCT/US94/05093 entitled MULTI-FUNCTION LIGHT SENSOR FOR VEHICLE, published as WO 94/27262 on Nov. 24, 1994; such as toll pay devices, including automatic toll pay devices, are disclosed in U.S. Pat. No. 5,485,520 to Chaum; such as remote transaction devices are disclosed in pending U.S. patent application entitled A VEHICLE MOUNTED REMOTE TRANSACTION INTERFACE SYSTEM, filed Apr. 8, 1998, Serial No. 09/057,428, now U.S. Pat. No. 6,158,655; such as trip computers, vehicle status displays, air bag activation status displays, instrumentation/console lighting, and other information display/user interface devices are disclosed U.S. patent application Ser. No. 09/244,726, filed Feb. 5, 1999, now U.S. Pat. No. 6,172,613, the entire disclosures of all the referenced applications, patents, and publications are incorporated by reference herein in their entireties.

Given the increasing number of components that are desirable in an interior rearview mirror assembly, there has been an increasing need to maximize the available space in the interior rearview mirror assembly. While the weight of the electronic devices do not significantly affect the vibration characteristics of the interior rearview mirror assembly, the increasing number of electronic devices require more and more space. When coupled with the concern for the vibration performance of the interior rearview mirror assemblies of vehicle memory mirror systems, perhaps the disadvantages associated with the weight of the driving mechanism and, furthermore, the crowding out of the space within the casing has discouraged such use of designs.

Consequently, there is a need for an interior rearview mirror assembly that is suitable for a vehicle memory mirror system and yet provides ample space for a multitude of electronic devices or accessories within the casing of the interior rearview mirror assembly while exhibiting reduced vibration as compared to interior rearview mirror assemblies of conventional memory mirror systems.

SUMMARY OF THE INVENTION

According to the present invention, a vehicle memory mirror system includes a housing and an actuator. The housing includes a mirror casing and a support, which mounts the mirror casing to the vehicle. The weight of the actuator is directly distributed to the vehicle via the support so that the interior rearview mirror assembly of the memory mirror system exhibits improved vibration characteristics and, further, is positioned such that the mirror assembly has increased capacity for housing a variety of accessories and/or devices.

In one form of the invention, a vehicular interior rearview mirror assembly for a vehicle memory mirror system includes a housing. The housing includes a mirror casing and a support for mounting the mirror casing to a vehicle. A reflective element is provided in the casing for rearward viewing when the mirror assembly is mounted to the vehicle. An electrical actuator is mounted to the support whereby the weight of the electrical actuator is borne by the support, with the actuator providing adjustment for the position of at least the reflective element about one or more axes.

In one aspect, the actuator is substantially positioned exteriorly of the mirror casing and engages a portion of the casing to adjust the position of the casing and the reflective element about the one or more axes. In further aspects, at least a portion of the actuator is positioned in an interior portion of the support.

In other aspects, the actuator supports the reflective element in the housing. For example, the housing may include a first portion which defines a mirror casing for the reflective element and the actuator and a second portion which forms the support for mounting the assembly to a vehicle whereby the housing comprises a fixed mount mirror housing. In further aspects, the second portion includes a storage space for storing at least one electrical device therein. In preferred form, the second portion comprises a tubular member having a transverse passage defining the storage space for supporting the electrical device.

In other aspects, the mirror casing includes a first compartment for supporting the reflective element therein and a second compartment for housing the actuator. In further aspects, the support extends into the second compartment and includes a mounting surface for mounting the actuator to the support. The actuator engages the casing to pivot the casing and the reflective element about the support.

In other aspects, the actuator is mounted to the casing in the second compartment and engages the support whereby the actuator pivots the casing and the reflective element about the support. In further aspects, the support includes a dual ball mount support arm, with the dual ball mount support arm permitting manual adjustment of the mirror casing about one or more axes.

According to another form of the invention, a vehicular interior rearview mirror assembly for a vehicle memory mirror system includes a mirror casing having a reflective element, a support, which is adapted to mount the casing to a vehicle, and an electrical actuator. The actuator is at least partially housed or positioned in the support and engages the casing to provide adjustment of the mirror casing and the reflective element about one or more axes.

In other aspects, the mirror casing includes a back wall, which is engaged by the actuator to reposition the mirror casing about the one or more axes. The back wall and the reflective element assembly define a compartment therebetween for positioning one or more electrical devices. In further aspects, the actuator includes an actuator housing with at least a portion of the actuator housing positioned in the interior portion of the support.

In further aspects, the actuator is coupled to at least one control module of the memory mirror system. Preferably, the control module comprises a mirror-based control module, which is positioned in the interior of the support for coupling to a vehicle-based control module of the memory mirror system.

According to yet another form of the invention, a vehicular interior rearview mirror assembly for a vehicle memory mirror system includes a housing, a reflective element, and an electrical actuator. The housing includes a mirror casing and a support. The actuator supports the reflective element in the mirror casing. The actuator provides adjustment of the reflective element in the casing and further is mounted to the casing whereby the weight of the actuator is directly distributed by the support to the vehicle to improve the vibration performance of the reflective element.

In one aspect, the housing includes a first portion defining the mirror casing and a second portion forming the support for fixedly mounting the mirror assembly to a vehicle windshield. For example, the support preferably comprises a tubular member having an interior space for housing one or more electrical devices.

In another form of the invention, a vehicular interior rearview mirror assembly for a vehicle memory mirror system includes a mirror casing, a reflective element supported in a first cavity of the mirror casing, a mounting member which is adapted to mount the assembly to a vehicle, and an electrical actuator. The electrical actuator is housed in a second cavity of the mirror casing and mounts the mirror casing to the mounting member. The electrical actuator provides adjustment of an orientation of the mirror casing and the reflective element about at least one axis.

In one aspect, the electrical actuator is mounted to the mirror casing with the electrical actuator engaging the mounting member casing to adjust the orientation of the mirror casing and the reflective element about the at least one axis. In another aspect, the electrical actuator is mounted to the mounting member, with the electrical actuator engaging the mirror casing to adjust the orientation of the mirror casing and the reflective element bout the at least one axis.

In further aspects, the mounting member preferably includes at least one ball mount to permit manual adjustment of the mirror casing about one or more axes.

It can be appreciated from the foregoing that an interior rearview mirror assembly is provided that distributes the weight of the actuator to the fixed portion of the mirror assembly, which in turn distributes the weight to the vehicle so that the mirror assembly exhibits enhanced vibration characteristics and, further, locates the actuator in a manner to increase the available space in at least the mirror casing.

These and other objects, advantages, purposes and features of the invention will become more apparent from a study of the drawing taken in conjunction with the review of the description that follows.

DESCRIPTION OF THE DRAWINGS

FIG. 3A is a schematic representation of the control system of the memory mirror system of the present invention;

DESCRIPTION OF THE PREFERRED EMBODIMENTS

Figure 1:
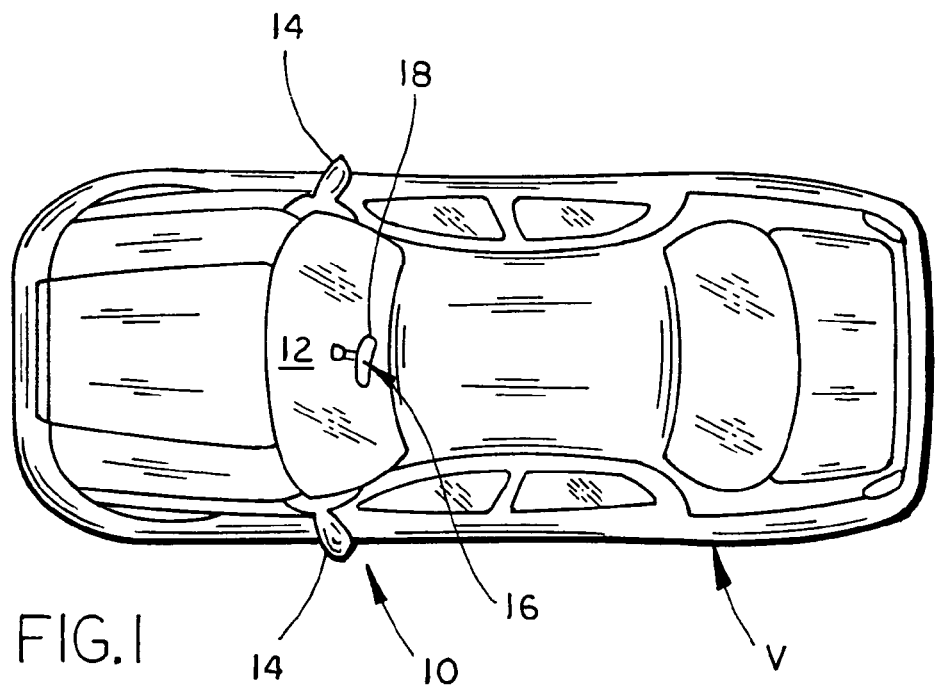
FIG. 1 is a plan view of a vehicle incorporating a memory mirror system according to the present invention.

Referring to FIG. 1, the numeral 10 generally designates a memory mirror System of the present invention for a vehicle V. Memory mirror system 10 includes passenger-side and driver-side exterior sideview mirror assemblies 14 and an interior rearview mirror assembly 16, which is mounted to a windshield 12 of vehicle V. In the present invention, interior rearview mirror assembly 16 is adapted to provide an interior rearview mirror assembly for memory mirror system 10, as noted above, which exhibits enhanced vibration characteristics and, further, provides increased storage capacity for various devices or accessories which may be incorporated into assembly 16, as will be more fully described below.

While reference is made to exterior rearview mirror assemblies 14, the focus of this present application is on interior rearview mirror assembly 16; therefore, further details of the exterior rearview mirror assemblies 14 are not provided herein. Examples of suitable exterior rearview mirrors, however, can be found in copending U.S. patent application entitled MEMORY MIRROR SYSTEM FOR VEHICLES, Ser. No. 09/448,690, filed Nov. 24, 1999, now U.S. Pat. Nos. 6,163,083 and 5,798,575, commonly assigned to Donnelly Corporation of Holland, Mich. the disclosures of which are herein incorporated by reference in their entireties. Reference is also made to U.S. Pat. Nos. 5,949, 591; 5,879,074; 5,863,116; 5,871,275; 5,823,654; 5,669, 699; 5,669,704; 5,624,176; 5,497,305; 5,786,772; 5,929, 786; and 5,971,552 for other features that may be incorporated into exterior rearview assemblies 14, the disclosures of which are herein incorporated by reference in their entireties.

Figure 2:
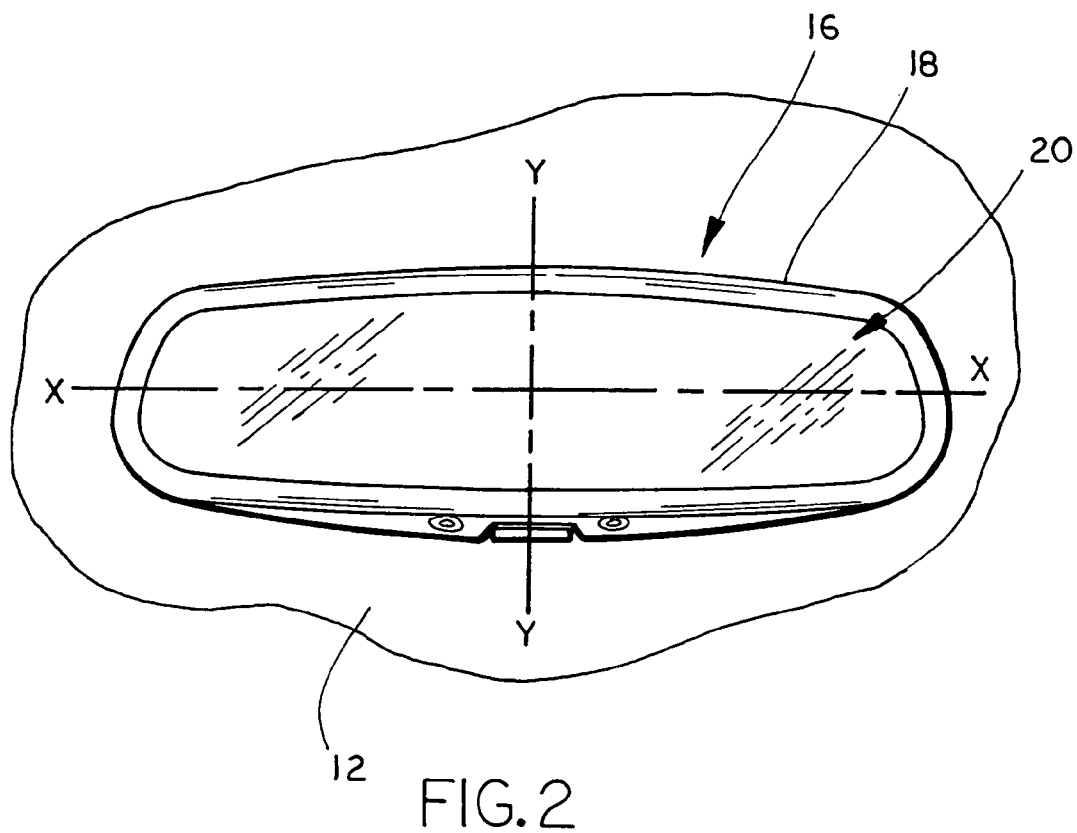
FIG. 2 is a front elevation view of an interior rearview mirror assembly of the memory mirror system of FIG. 1.
Figure 3:
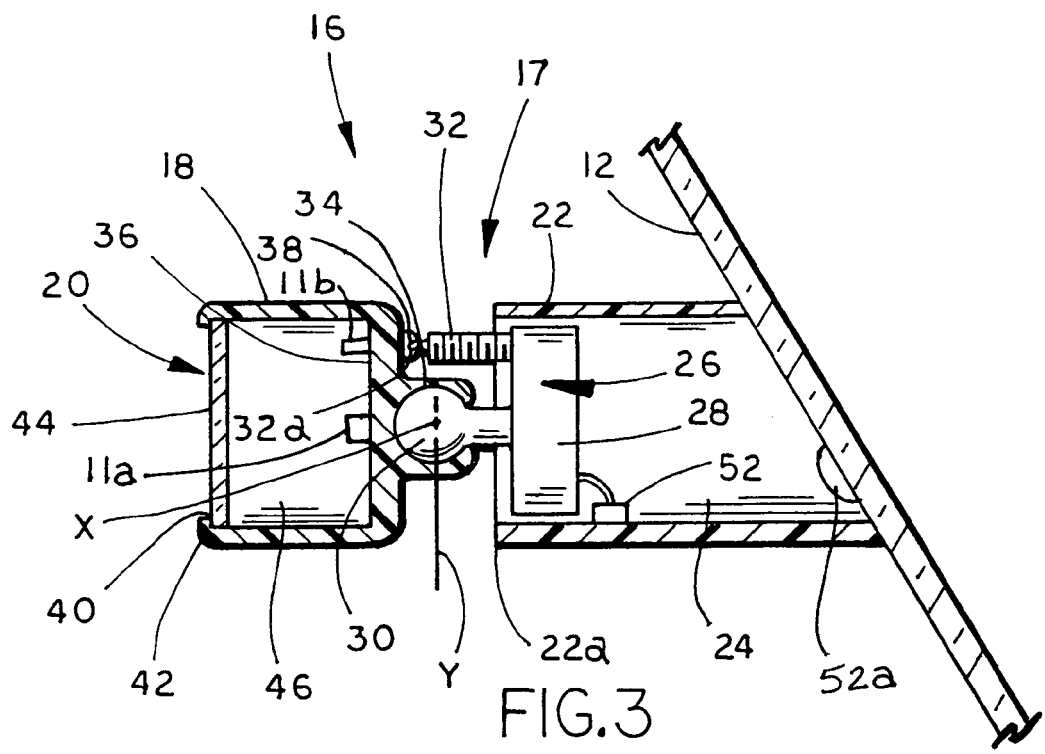
FIG. 3 is a cross-section taken along line III—III of FIG. 2.

Referring to FIGS. 2 and 3, interior rearview mirror assembly 16 includes housing 17 and a reflective element assembly 20. Housing 17 includes a mirror casing 18 and a support or mounting member 22. Casing 18 is a generally elongate cup-shaped casing as shown in FIG. 2 with a rearward opening 40 in which reflective element assembly 20 is supported. In the illustrated embodiment, reflective element assembly 20 and casing 18 are adjustable about one or more axes, for example axes X—X and Y—Y (FIG. 2), to provide adjustment of the rearward field of view provided by reflective element assembly 20. As used herein, the terms "rearward facing" and "forward facing" are used to define directions relative to a vehicle when the mirror assembly is mounted to the vehicle. "Rearward facing" means the object is facing the rear of the vehicle. "Forward facing" means that the object is facing toward the front end of the vehicle.

As best seen in FIG. 3, mounting member 22 mounts casing 18 to windshield 12 on a conventional mounting button (not shown), such as described in U.S. Pat. Nos. 5,487,522; 5,671,996; 5,820,097; 5,615,857; 5,330,149; 5,100,095; 4,930,742; or 4,936,533 or copending U.S. patent application Ser. No. 08/781,408, filed Jan. 10, 1997, now U.S. Pat. No. 5,820,097, all commonly assigned to Donnelly Corporation, the disclosures of which are herein incorporated by reference in their entireties, which provides a break-away mounting or release mechanism as is known in the art. It should be understood that mounting member 22 may mount casing 18 to a header portion of the vehicle such as described, for example, in U.S. Pat. Nos. 5,487,522; 5,615,857; or 5,671,996, the disclosures of which are incorporated by reference in their entireties herein. In preferred form, mounting member 22 comprises an enlarged tubular member having a cavity 24 formed therein for housing and supporting an actuator 26 which provides adjustment to casing 18 and reflective element assembly 20 about one or more axes to adjust the rearward field of view, as will be more described below.

Actuator 26 preferably comprises an electrical actuator and includes an actuator housing 28, a pivot or ball member 30 which extends rearwardly from housing 28, and at least one telescoping positioning member 32 which extends into and out of housing 28 to adjust the position of mirror casing 18. Housing 28 may include one or more motors and associated gearing for driving positioning member 32 in and out of housing 28, as is known in the art. Preferably, at least a portion of actuator 26, for example housing 28, is enclosed or housed in mounting member 22, with ball mount 30 and positioning member 32 extending outwardly from end 22a of mounting member 22 for engaging casing 18. Reference is made to U.S. Pat. Nos. 5,986,364 and 5,900,999 for examples of suitable actuator designs, the disclosures of which are herein incorporated by reference herein in their entireties. It should be understood that the electrical actuator may incorporate one or more muscle wires which are operable to pull or push in response to an electrical signal. Muscle wires, which are also known as shape memory alloy, can assume radically different forms or "phases" at distinct temperatures. When conducting an electric current, the muscle wire heats and shortens in length, generating a useable amount of force. Such muscle wires are typically bi-metals such as of a nickel-titanium alloy (such as Nitinol) and are attached such that the wires contract when electricity is applied.

Referring again to FIG. 3, casing 18 includes a first socket member 34 which projects rearwardly from a back wall 36 of casing 18 and a second socket member 38 which similarly extends rearwardly of back wall 36 of casing 18. Socket 34 receives ball member 30 and pivotally mounts casing 18 onto actuator 26, while socket 38 provides a pin connection between positioning member 32 and casing 18. Positioning member 32 includes a ball member 32a which is engaged by socket member 38 and, further, includes a transverse pin which rests in a corresponding groove or seat provided in socket member 38 to restrict rotational movement of positioning member 32 such that when the gearing inside housing 26 is driven by the motor, positioning member 32 will extend in and out of housing 28, as is also well known in the art. Though a single positioning member 32 is illustrated, it can be appreciated that actuator 26 may include two or more positioning members to provide multi-axis positioning of casing 18 about axis X—X and axis Y—Y.

As best understood from FIG. 3, reflective element assembly 20 is supported and retained in rearward facing opening 40 of mirror casing 18 by a bezel or bezel portion 42. Bezel 42 and mirror casing 18 are both preferably formed from a resinous polymeric material or plastic and, more preferably, from a melt processible plastic and, most preferably, from an engineered polymer, for example an ABS plastic. Bezel 42 extends around and over the perimeter of reflective element assembly 20 and is secured to casing 18 to thereby retain reflective element assembly 20 in casing 18. In this manner, reflective element assembly 20 is supported by mirror casing 18. In addition, by locating actuator 26 exteriorly of casing 18, the space between reflector assembly 20 and back wall 36 of casing 18 provides a storage space 46 for housing one or more accessories or devices (such as 11a, 11b, in FIG. 3), as described below.

Reflective element assembly 20 includes a mirror reflector 44, which may comprise a prismatic mirror reflector or an electrically variable reflectance mirror reflector, such as electrochromic mirror reflectors, as are both known in the mirror art. In addition, reflective element assembly 20 may comprise a bent, wide-angle mirror reflector rather than a flat mirror reflector. If a bent, wide-angle mirror reflector is used, it is preferable that the mirror reflector (44) comprise a glass substrate coated with a bendable reflector coating (such as of silicon as described in copending U.S. patent applications entitled ELEMENTAL SEMICONDUCTOR MIRROR, filed May 17, 1999, Ser. No. 09/313,152, now U.S. Pat. No. 6,065,840; and ELEMENTAL SEMICONDUCTOR MIRROR FOR VEHICLES AND METHOD OF MAKING SAME, filed May 8, 1998, Ser. No. 09/174,810; and U.S. Pat. Nos. 5,535,056 and 5,751,489, all commonly assigned to Donnelly Corporation of Holland, Mich., the disclosures of which are incorporated by reference herein in their entireties). Where an electrochromic mirror reflector is preferred, suitable electrochromic mirror reflectors include electrochromic mediums described in commonly assigned U.S. Pat. Nos. 5,140,455 and 5,151,816 or a solid state electrochromic medium described in the following publications: N. R. Lynam, "Electrochromic Automotive Day/Night Mirrors", *SAE Technical Paper Series* 870636 (1987); N. R. Lynam, "Smart Windows for Automobiles", *SAE Technical Paper Series* 900419 (1990); N. R. Lynam and A. Agrawal, "Automotive Applications of Chromogenic Materials", *Large Area Chromogenics: Materials and Devices for Transmittance Control*, C. M. Lampert and C. G. Grandquist, EDS., Optical Engineering Press, Wash. (1990), the disclosures of which are hereby incorporated by reference herein in their entireties. Other suitable electrochromic reflectors are described in U.S. Pat. Nos. 5,567,360; 5,525,264; 5,610,756; 5,406,414; 5,253,109; 5,076,673; 5,073,012 or 5,117,346, which are all commonly assigned to Donnelly Corporation, the disclosures of which are herein incorporated by reference in their entireties.

Typically, in an electrochromic mirror reflector, two glass plates sandwich the electrochromic medium. The reflective coating may be deposited either on the rear most surface away from the viewer (to create a fourth surface reflector as is known in the art) or disposed on the front surface of the rear most substrate (to create a third surface reflector as is known in the art). The substrates can be of equal or different glass thicknesses. The electrochromic medium can be a liquid medium or a solid medium, such as a solid polymer matrix electrochromic medium such as is disclosed in U.S. patent application Ser. No. 09/350,930, filed Jul. 12, 1999, entitled ELECTROCHROMIC POLYMERIC SOLID FILMS, MANUFACTURING ELECTROCHROMIC DEVICES USING SUCH FILMS, AND PROCESSES FOR MAKING SUCH SOLID FILMS AND DEVICES, to Desaraju V. Varaprasad et al., the entire disclosure of which is hereby incorporated by reference herein. For example, an interior rearview mirror reflector can comprise a 1.1 mm thick front substrate, a 2.0 mm thick rear substrate, and an aluminum, silver, silver alloy, aluminum alloy or the like highly reflective metal film on the front surface of the rear substrate (i.e. third surface reflector) and the electrochromic medium may be solid such as electrochromic Solid Polymer Matrix (SPM)™ comprising a color changing cross-linked polymer solid film. Most preferably, the front substrate comprises a glass plate of thickness less than about 1.6 mm, most preferably about 1.1 mm thickness or lower, and the rear substrate comprises a glass plate of thickness equal to or greater than about 1.6 mm, more preferably greater than about 1.8 mm thickness, most preferably equal to or greater than about 2.0 mm thickness. The rearmost surface of the rear substrate (the fourth surface as known in the mirror art) is reflector coated with a high reflecting metal film such as of aluminum or silver, or an alloy of aluminum or of silver. Most preferably, the front-most surface of the rear substrate (the third surface as known in the mirror art) is reflector coated with a high reflecting metal film such as of aluminum or silver, or an alloy of aluminum or of silver.

Interior rearview mirror assembly 16 may incorporate a wide variety of different accessories and devices. For example, assembly 16 may incorporate video screens, such as described in U.S. patent application entitled INTERIOR REARVIEW MIRROR ASSEMBLY INCORPORATING A VIDEO SCREEN, filed Mar. 2, 2000, Ser. No. 60/186,520, or pending U.S. patent application entitled INTERACTIVE AUTOMOTIVE REAR VISION SYSTEM, Ser. No. 60/192,721, filed on Mar. 27, 2000, by Niall R. Lynam and Francis O'Brien, both commonly assigned to Donnelly Corporation, the entire disclosures of which are herein incorporated by reference.

Other components that may be housed in assembly 16 include, for example, video cameras, for example which may be used to detect the presence of moisture on a windshield and to actuate windshield wipers accordingly, such as described in copending U.S. patent application Ser. No. 08/621,863, filed Mar. 25, 1996, entitled VEHICLE HEADLIGHT CONTROL USING IMAGING SENSOR, by Schofield et al., now U.S. Pat. No. 5,796,094, or mirror mounted cameras for vehicle internal cabin monitoring disclosed in U.S. Pat. Nos. 5,877,897 and 5,760,962, or mirror mounted cameras for rear vision systems as disclosed in U.S. Pat. Nos. 5,959,367; 5,929,786; 5,949,331; 5,914,815; 5,786,772; 5,798,575; 5,670,935; and pending U.S. patent applications entitled VEHICLE REARVIEW MIRROR DISPLAY SYSTEM, Ser. No. 09/304,201, filed May 3, 1999, now U.S. Pat. No. 6,198,409; VEHICLE MIRROR DIGITAL NETWORK AND DYNAMICALLY INTERACTIVE MIRROR SYSTEM, Ser. No. 09/375,315, filed Aug. 16, 1999, now U.S. Pat. No. 6,175,164; WIDE ANGLE IMAGE CAPTURE SYSTEM FOR VEHICLES, Ser. No. 09/199,907 filed Nov. 25, 1998; WIDE ANGLE IMAGING SYSTEM, Ser. No. 09/361,814, filed Jul. 27, 1999, now U.S. Pat. No. 6,201,642; VEHICLE IMAGING SYSTEM WITH STEREO IMAGING, Ser. No. 09/372,915, filed Aug. 12, 1999, now U.S. Pat. No. 6,396,397; VEHICLE REARVIEW MIRROR DISPLAY SYSTEM, Ser. No. 09/300,201, filed May 3, 1999; and REARVIEW VISION SYSTEM WITH INDICIA OF BACKUP TRAVEL, Ser. No. 09/313,139, filed May 17, 1999, now U.S. Pat. No. 6,222,447, which are all commonly assigned to Donnelly Corporation of Holland, Mich., the disclosures of which are herein incorporated by reference in their entireties.

For example, such mirror mounted cameras may be used for a baby minder system such as the vehicle interior monitoring system described in U.S. Pat. Nos. 5,877,897 and 5,760,962 or the rear vision system described in pending U.S. patent applications Ser. No. 09/361,814, filed Jul. 27, 1999, now U.S. Pat. No. 6,201,642, and Ser. No. 09/199,907 filed Nov. 25, 1998, and U.S. patent application Ser. No. 09/433,467, filed Nov. 4, 1999, entitled VEHICLE INTERIOR MIRROR ASSEMBLY, now U.S. Pat. No. 6,326,613, to Patrick Heslin and Niall R. Lynam, all of which are incorporated by reference in their entireties herein. An interior surveillance system permits the driver of the vehicle to observe behavior or the activities of babies or children or other passengers seated in the rear seat. This is especially advantageous when the child or baby is in a rearward facing car seat, where the child or baby would ordinarily not be visible to the driver while driving. For example, a camera, such as a CMOS or CCD camera, can be mounted to view the rear seat area of the vehicle so that the driver can view what is occurring, such as in a rear seat mounted baby seat or with a rear seat passenger such as children. Preferably, to enable viewing of the rear seat occupant or occupants even by night, the target field of view of the camera may be illuminated in a manner that provides adequate visibility for the camera to discern what is occurring in the rear seat in a darkened vehicle cabin but not illuminating in a manner that causes glare, distraction, and/or discomfort to any vehicle occupants, including the driver and/or rear seat passengers. For example, such a rear seat monitoring camera illumination is preferably achieved using directed low level non-incandescent light sources, such as light emitting diodes (LEDs), organic light emitting material, electroluminescent sources (both organic and inorganic), and the like, and most preferably such non-incandescent sources are low power and are directed low intensity sources, such as described in U.S. Pat. No. 5,938,321 and co-pending application entitled INTERIOR MIRROR ASSEMBLY FOR A VEHICLE INCORPORATING A SOLID-STATE LIGHT SOURCE, Ser. No. 09/287,926, filed Apr. 7, 1999, now U.S. Pat. No. 6,139,172, which are incorporated herein by reference in their entireties. The baby-minder camera may be mounted as a part of the rearview mirror assembly and, most preferably, may be mounted as a part of a roof area of the interior vehicle cabin such as a header, including a front header of a roof or a rear header or a header console of a roof. It may be desirable to mount a baby-minder camera to the rear header of a roof when it is desirable to view rear facing child support seats. Most preferably, a plurality of at least two, more preferably at least four, and most preferably at least six LEDs (or similar low level, directed, low-current light sources such as electroluminescent sources and organic light emitting sources) are mounted with a camera (preferably, such as to form a ring around the camera) with the light projected from the individual LEDs directed to be coincident with the camera field of view and to illuminate the target area desired to be viewed. The LEDs being directed low level sources will not glare or cause discomfort to occupants when illuminated. Further, camera illumination sources can be illuminated whenever the ignition switch is on to operate the vehicle or at least when the ignition switch is placed in an "accessory on" position so that both the camera and illumination lights are operating on vehicle battery power even when parked. Alternately, the illumination lights can be operational only when the baby-minder camera is selected to be operational. While it is preferred to use non-incandescent lights, incandescent light sources can be used, most preferably high intensity, low current incandescent light sources. For example, when the camera is activated to view the rear seat or to view a baby seat or the like, the dome light in the vehicle, which typically comprises an incandescent light source, can illuminate so that the rear seat area is illuminated to assist visibility for the camera. A circuit or other device can be provided that illuminates the dome light (or a similar rear seat-illuminating interior light source such as a rail lamp or the like) whenever the camera is selected to view the rear seat. Optionally, the dome light or similar interior light within the interior cabin, once caused to illuminate when the camera is activated, can cease to illuminate after a determined time interval (such as 5 seconds or ten seconds or longer) under the control of a timeout circuit or device. By providing a timeout, the driver can selectively view the status of passengers in the rear seat of the vehicle by selecting a baby-minder camera or similar rear seat viewing function (such as by voice command, user-operated switch or the like). Upon selection of the camera function, whatever is being viewed on the video screen in the vehicle may be interrupted (or superimposed over or the like), the interior light in the cabin (such as the dome light) will illuminate, a timeout will initiate, and the driver (or other front-seat occupant) can view the rear seat status for the duration of the timeout. Once the timeout elapses, the interior light ceases to illuminate, and preferably, the camera ceases to be activated and the video screen reverts to its pre-event status. Optionally, a reverse-aid rearward viewing camera can be mounted to the rear of the vehicle in order to display to the driver, upon selecting a reverse gear, a field of view immediately rearward of the vehicle so as to assist the driver in reversing the vehicle. Such vehicle reverse-aid camera systems are disclosed in U.S. patent application Ser. No. 09/361,814 entitled WIDE ANGLE IMAGING SYSTEM, to Bos of Donnelly Corporation, filed Jul. 27, 1999; U.S. patent application Ser. No. 09/199,907, entitled WIDE ANGLE IMAGE CAPTURE SYSTEM FOR VEHICLE, to Bos et al of Donnelly Corporation, filed Nov. 25, 1998; U.S. patent application entitled REARVISION SYSTEM FOR VEHICLE INCLUDING PANORAMIC VIEW, filed Nov. 19, 1997, Ser. No. 08/952,026, now U.S. Pat. No. 6,498,620; and in U.S. patent application Ser. No. 09/313,139, entitled REARVIEW VISION SYSTEM WITH INDICIA OF BACKUP TRAVEL to Schofield et al. of Donnelly Corporation, filed May 17, 1999, now U.S. Pat. No. 6,222,447, the disclosures of which are hereby incorporated by reference herein. For example, when the driver selects a reverse gear, a view of the back-seat of the vehicle is automatically replaced with a view rearward of the vehicle provided by the rearward-facing reverse-aid camera (typically mounted at the vehicle rear license plate area or the like) and when reverse gear is disengaged, the view of the back-seat is once again displayed at the display screen visible to the driver in the interior cabin of the vehicle (such as at, on or in the interior rearview mirror assembly). Also, when a baby is small, a rear-facing child seat is preferred (i.e. the child faces the rear of the vehicle cabin) whereas as the child grows, a forward-facing child seat is preferred. In order to cater for forward-facing child seats versus rearward-facing child seats, two cameras can be mounted such as in the roof area of the vehicle. One forward viewing camera (i.e. viewing forward of the vehicle relative to the direction of forward motion of the vehicle) can be mounted at a roof location (such as above the vehicle rear window) to view a baby seated in a rear-facing baby seat and a second rearward viewing camera (i.e. viewing rearward of the vehicle relative to the direction of forward motion of the vehicle) can be mounted at a roof location (such as above the vehicle front windshield or as part of the interior mirror assembly) to view a child seated in a forward-facing baby seat. A switch can be provided to allow the driver to choose to use any one of the forward viewing camera and the rearward viewing camera. Optionally and preferably from a cost viewpoint, a single camera module can be provided that can connect to and/or dock into two or more spaced and separate camera module receiving stations. One (i.e. a first) camera module receiving station can be high-mounted at a forward location in the vehicle cabin (such as in a header console above and adjacent the front windshield or in the headliner above and adjacent the front windshield or as part of the interior rearview mirror assembly) and a second camera module receiving station can be located at a rearward location in the vehicle cabin (such as above and adjacent to the rear window, or at a position in the headliner of the vehicle that is located above and rearward of the rear seat, or as part of a dome lamp or other interior lighting assembly, preferably a lighting assembly comprising a plurality of light emitting diodes and, most preferably, a lighting assembly comprising a plurality of light emitting diodes comprising at least one white light emitting diode) that is spaced and separate from the location of the first camera receiving station. A single camera module can be provided that plugs into, and electrically/electronically connects to, any one of the two camera receiving stations provided. When the camera module is plugged into the first camera receiving station, the camera field of view is directed rearwardly in the vehicle cabin to monitor a back seat area and thus monitor a child strapped in a forwardly-facing child seat and the like. The camera receiving station provides power to the camera and receives video signals generated by the camera. If, however, a rearward-facing baby seat was mounted on the rear seat, the driver can unplug the camera module from the first camera receiving station and plug it into the second camera receiving station. When plugged into the second camera receiving station, the camera lens faces forwardly in the cabin and its field of view is directed to capture and hence display the rearward-facing baby strapped in the rearwardly-facing baby (or child) seat. Optionally, a plurality of camera receiving stations (such as three or four or more) can be provided to allow a single camera be mounted at a plurality of locations in a vehicle cabin with its field of view selected to be directed to a specific portion of the vehicle cabin by plugging the camera module into a specific one of the available plurality of camera receiving stations. This allows a "plug and view" capability for the vehicle user. As an alternate, or as a supplement, to a plurality of camera receiving stations, a camera can be movably mounted on a rail that also functions as a power strip that is affixed to an interior vehicular cabin structure such as a headliner of the vehicle or to a window of a vehicle (such as is disclosed in U.S. patent application Ser. No: 08/895,729, entitled VEHICLE WINDOW ASSEMBLY FOR MOUNTING INTERIOR VEHICLE ACCESSORIES to John W. Carter et al. of Donnelly Corporation, filed Jul. 17, 1997, now U.S. Pat. No. 6,019,411, the entire disclosure of which is hereby incorporated by reference herein). Thus, for example, a camera can move along a channel in a rail attached to a vehicle cabin roof headliner. When stopped at a particular position along the rail, the camera module can receive power input from and deliver signal output to the rail such as via conductive brush connectors such as carbon brushes. Alternately, the camera module can transmit video image data wirelessly within the cabin, such as by infrared or by radio-frequency transmission (such as part of a short range, local RF broadcast network operating under a BLUETOOTH protocol available from Motorola of Schaumberg Ill.), to a cabin-mounted receiver (or externally of the vehicle to a remote receiver such as might be used in a cabin security monitoring camera-based system that, for example, monitors the interior vehicle cabin while the vehicle is parked in order to detect intrusion by an unauthorized party). Optionally, the camera module mounted in the vehicle cabin is detachably mounted so that it can be removed from the vehicle both as an anti-theft device and in order to allow the camera to be used outside the vehicle such as in a child's crib in a home. In this regard, a video camera (such as the detachable vehicle camera module) can be mounted at a distance from the vehicle such as in the like of a child's bedroom in a house to monitor, for example, a child sleeping in a crib, and its video image can be wirelessly transmitted (such as by radio-frequency transmission) or transmitted via a wireless INTERNET linkage to the vehicle so the driver and/or other occupants of the vehicle can view the video image of the child in the crib at home on a vehicular video screen, preferably on a screen mounted at, on or in the interior mirror assembly, while the vehicle is located and operating at a distance from the location of the home where the camera generating the video image is located. Also, the camera used in the applications described above can be an autofocusing and/or autoexposure camera using an autofocusing lens system and/or an autoexposure system (such as via an automatically adjustable iris system). Also, optionally, the field of view of the lens of the camera can be adjusted to view a multitude of locations in the vehicle cabin such as by a joystick-control or the like.

Other devices which may be incorporated into interior rearview mirror assembly 16 include light emitting sources. Such as light emitting sources, for example such as light emitting diodes, can be used to provide lighting for any camera that feeds an image to the mirror-mounted video screen. Light emitting diodes can be used to provide illumination in various colors such as white, amber, yellow, green, orange red, blue, or their combination, or the like may be used. Alternately, other light emitting elements can be used to provide illumination for any camera that feeds an image to the mirror-mounted video screen, such as incandescent sources, fluorescent sources including cold-cathode fluorescent sources, electroluminescent sources (both organic and inorganic).

The concepts of this present invention can be used with interior rearview mirror assemblies which are equipped with a variety of features and accessories, such as a home access transmitter, garage door opener transmitters, a high/low (or daylight running beam/low) headlamp controller, a hands free phone attachment, a video telephone function, a remote keyless entry receiver, a compass, a seat occupancy detection, map lights or multiple reading lights such as described in commonly assigned U.S. Pat. Nos. 5,669,698; 5,820,245; 5,671,996; 5,813,745; 5,178,448; 4,733,336; and 4,646,210; the disclosures of all of which are herein incorporated in their entireties. Additional features and accessories that may be incorporated into the rearview mirror assembly include: A trip computer, an intrusion detector, displays indicating, for example passenger air bag status, including information displays such as a PSIR (Passenger Side Inflatable Restraint) display, an SIR (Side-Airbag Inflatable Restraint) display, compass/temperature display, a tire pressure status display or other desirable displays and the like, such as those described in U.S. patent application Ser. No. 09/244,726, filed Feb. 5, 1999, now U.S. Pat. No. 6,172,613, the disclosure of which is hereby incorporated by reference herein. For example, the rearview mirror assemblies of the present invention may include: Antennas, including GPS or cellular phone antennas, such as disclosed in U.S. Pat. No. 5,971,552; a communication module, such as disclosed in U.S. Pat. No. 5,798,688; displays such as shown in U.S. Pat. No. 5,530,240 or in U.S. pending application Ser. No. 09/244,726, filed Feb. 5, 1999, now U.S. Pat. No. 6,172,613; blind spot detection systems, such as disclosed in U.S. Pat. Nos. 5,929,786 or 5,786,772; transmitters and/or receivers, such as garage door openers, a digital network, such as described in U.S. Pat. No. 5,798,575; a high/low head lamp controller, such as disclosed in U.S. Pat. No. 5,715,093; a memory mirror system, such as disclosed in U.S. Pat. No. 5,796,176; a hands-free phone attachment, a video device for internal cabin surveillance and/or video telephone function, such as disclosed in U.S. Pat. Nos. 5,760,962 and 5,877,897 and co-pending application Ser. No. 09/433,467, now U.S. Pat. No. 6,326,613; a remote keyless entry receiver; map lights, such as disclosed in U.S. Pat. Nos. 5,938,321; 5,813,745; 5,820,245; 5,673,994; 5,649,756; or 5,178,448; microphones and/or speakers, such as disclosed in U.S. patent applications Ser. No. 09/361,814, filed Jul. 27, 1999, now U.S. Pat. No. 6,201,642, and 09/199,907, filed Nov. 25, 1998; a compass, such as disclosed in U.S. Pat. No. 5,924,212; seat occupancy detector; a trip computer; an ONSTAR System or the like, with all of the referenced patents and applications being commonly assigned to Donnelly Corporation, the disclosures of which are herein incorporated by reference in their entireties.

The interior rearview mirror assembly may also include a compass/temperature and a clock display, fuel level display, and other vehicle status and other information displays. Furthermore, information displays may be incorporated which provide information to the driver or occupants of the vehicle such as warnings relating to the status of the passenger airbag. In commonly assigned co-pending application Ser. No. 09/244,726, filed by Jonathan E. DeLine and Niall R. Lynam, on Feb. 5, 1999, now U.S. Pat. No. 6,172,613, information displays are provided which include information relating to vehicle or engine status, warning information, and the like such as information relating to oil pressure, fuel remaining, time, temperature, compass headings for vehicle direction, and the like, the disclosure of which is incorporated herein by reference in its entirety. The passenger side air bag on/off signal may be derived from various types of seat occupancy detectors such as by video surveillance of the passenger seat as disclosed in co-pending, commonly assigned U.S. patent application Ser. No.

PGT/US94/01954, tiled Feb. 25, 1994, the disclosure of which is hereby incorporated by reference, or by ultrasonic or sonar detection, infrared sensing, pyrodetection, weight detection, or the like. Alternately, enablement/displayment of the passernrer side air bag operation can be controlled manually such as through a user operated switch operated with the ignition key of the vehicle in which assembly 10 is mounted as described in co-pending, commonly assigned U.S. patent application Ser. No. 08/799,734, filed Feb. 12, 1997, now U.S. Pat. No. 5,786,772, the disclosure of which is incorporated by reference herein in its entirety. In addition, interior rearview mirror assembly 16 may include electronic and electric devices, including a blind spot detection system, such as the type disclosed in U.S. patent application Ser. No. 08/799,734 entitled VEHICLE BLIND SPOT DETECTION AND DISPLAY SYSTEM, invented by Schofield et al. and filed Feb. 12, 1997, now U.S. Pat. No. 5,786,772, or rain sensor systems, for example rain sensor systems which include windshield contacting rain sensors such as described in U.S. Pat. No. 4,973,844 entitled VEHICULAR MOISTURE SENSOR AND MOUNTING APPARATUS THEREFORE, or non-windshield contacting rain sensors, such as described in PCT International, Application PCT/US94/05093 entitled MULTI-FUNCTION LIGHT SENSOR FOR VEHICLE, published as WO 94/27262 on Nov. 24, 1994, the disclosures of which are hereby incorporated by reference herein in their entireties. Where windshield contacting rain sensors are included, the rain sensors (52a) can be mounted in passage 24 of mounting member 22.

The mirror-mounted video screen can display the output from a rear vision back-up camera, such as disclosed in co-pending applications Ser. No. 09/199,907, filed Nov. 25, 1998, and 09/361,814, filed Jul. 27, 1999, now U.S. Pat. No. 6,201,642, commonly assigned to Donnelly Corporation, the disclosures of which are herein incorporated by reference in their entireties, along with vehicle instrument status, such as an vehicle information display, such as information relating to fuel gauge levels, speed, climate control setting, GPS directional instructions, tire pressure status, instrument and vehicle function status, and the like.

As disclosed in U.S. patent application Ser. No. 09/449,121, filed Nov. 24, 1999, now U.S. Pat. No. 6,428,172, the entire disclosure of which is herby incorporated by reference herein, interior rearview mirror assembly 16 of the present invention may incorporated various accessories which can be docked onto the assembly for purposes of storage, battery charging, electrical powering, data input or output and similar functions. Such dockable features are detachable by a user of the vehicle from the mirror assembly and are optionally removable from the vehicle for use outside the vehicle. For example, a dockable feature may comprise a light assembly, such as a flashlight assembly, or may comprise a cellular phone, a phone module, pager, INTERNET connector, or the like. In the case of docking a telecommunication device such as a phone or a pager, the interior mirror assembly is preferably adapted to connect to the telecommunication device such as a phone in a manner such that the vehicle control system will recognize the phone and, optionally, direct incoming phone calls to speakers, which may be located in the mirror assembly or elsewhere in the vehicle. In this manner, the dockable phone may provide removable hands-free phone function. Furthermore, in one form, the phone may automatically be activated by the occupant's voice or a switch or by the docking of the phone onto the mirror assembly. In this manner, the phone may be removed when the occupant exits the car for normal remote use or may be docked for hands-free use.

Preferably, interior rearview mirror assembly 16 includes a power source, such as a recharger that recharges the battery or batteries in any dockable accessory, which is stored or attached thereto. As previously noted, such dockable accessories can include pagers, cellular phones, flashlights or the like. In this manner, the dockable accessory can be docked for recharging. In the case of the light assembly, the light assembly can be docked for use as a map reading light or the like. When undocked, the light assembly (which includes internal batteries) may be used as a flashlight, as previously noted.

Alternately, the phone module of a cellular or digital phone may be docked on interior mirror assembly 16 such that the vehicle system couples the phone module to the speakers and microphones to provide a hands-free phone system. In this maimer, the module can be quickly and easily docked and, further, removed for replacement into the phone housing. Furthermore, a hands-free phone system may be coupled to one or more of the video screens incorporated into the interior rearview mirror assembly to form a teleconferencing system, with the video screen displaying images of the one or more of the parties. Optionally, the interior rearview mirror assembly may incorporate a camera so that bi-directional teleconferencing can be achieved. Reference for such video-telephone applications is made to co-pendiiig U.S. patent application Ser. No. 08/918,772, entitled MODULAR REARVIEW MIRROR ASSEMBLY, filed Aug. 25, 1997, now U.S. Pat. No. 6,124,886, which is commonly assigned to Donnelly Corporation of Holland, Mich., the disclosure of which is herein incorporated by reference in its entirely.

Referring to FIG. 3A, actuator 26 of interior rearview mirror assembly 16 is coupled to an electronic control system 50. Electronic control system 50 includes mirror-based control modules 52 positioned in each exterior rearview mirror assembly 14 and interior rearview mirror assembly 16 and a vehicle-based control module 54 which is interconnected to each of the respective mirror-based control modules 52. Control module 54 may be located in the vehicle, for example in a vehicle door or in or behind the dashboard or the like. In addition, control module 54 may be associated with other vehicle control functions such as seat position control, window controls, or the like. For further details of a suitable memory mirror electronic control system, reference is made to copending application entitled MEMORY MIRROR SYSTEM FOR VEHICLES, Ser. No. 09/448,690, filed Nov. 24, 1999, now U.S. Pat. Nos. 6,163,083 and 5,798,575, the disclosures of which are incorporated by reference herein in their entireties.

Figure 4:
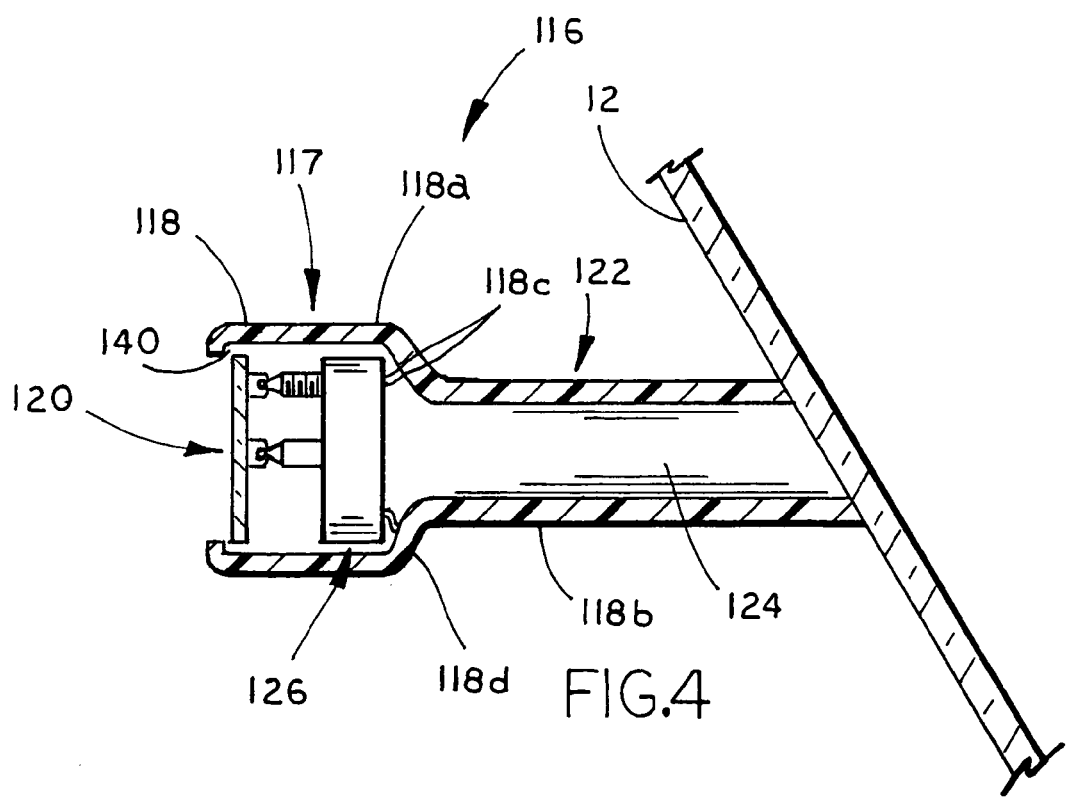
FIG. 4 is a similar cross-section view to FIG. 3 illustrating a second embodiment of the interior rearview mirror assembly of the present invention.

Referring to FIG. 4, a second embodiment 116 of the interior rearview mirror assembly of the present invention is illustrated. Interior rearview mirror assembly 116 includes a housing 117 and a reflective element assembly 120. Housing 117 includes a mirror casing 118 and a support 122, which mounts casing 118 to windshield 12. Reflective element assembly 120 is supported in casing 118 by an actuator 126, preferably an electric actuator similar to actuator 26 and is coupled to a memory mirror system similar to system 10 described in the first embodiment. Reference is also made to the first embodiment for details for suitable casing materials, suitable reflective element assemblies, and optional devices or accessories that may be incorporated into assembly 116.

Housing 117 includes a first portion 118a, which defines casing 118, and a second portion 118b which is integral with and extends forwardly from first portion 118a to form support or mounting member 122 for mounting casing 118 to vehicle windshield 12. Casing 118 is generally cup shaped similar to casing 18 and includes a cavity and a rearward facing opening 140 in which reflective element assembly 120 is positioned by actuator 126.

In the preferred embodiment, mounting portion 122 comprises a tubular member and provides a fixed mounting for casing 118 to windshield 112 on a conventional mounting button, as is known in the mirror art, to provide a break-away mounting for assembly 116. Thus, interior rearview mirror assembly 116 includes a fixed mount housing but with an adjustable reflective element within the casing 118.

Preferably, actuator 126 is mounted directly to casing wall 118c of casing 118 and, most preferably, to a forward portion or back wall 118d of casing wall 118c. In this manner, actuator 126 is rigidly supported within casing 118 with the weight of actuator 126 being directly transferred to windshield 12 by way of mounting member 122. Furthermore, mounting member 122 preferably comprises a hollow tubular member having a passageway 124 which may be used to store or house a variety of electrical and electronic devices as described in reference to the first embodiment, including, for example rain sensors as previously described. It can be appreciated, therefore, that mirror assembly 116, exhibits reduced vibration and, further, provides ample space for storing a wide variety of accessories and devices.

Figure 5:
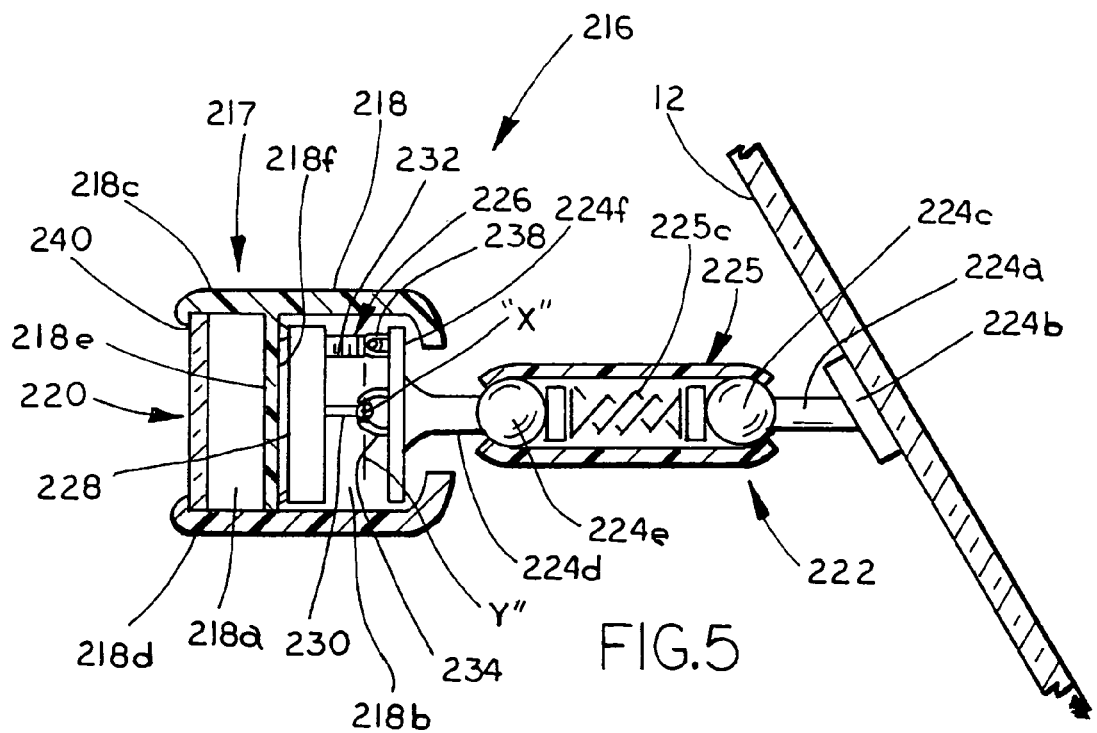
FIG. 5 is a cross-section similar to FIG. 3 illustrating a third embodiment of the interior rearview mirror assembly of the present invention.
Figure 6:
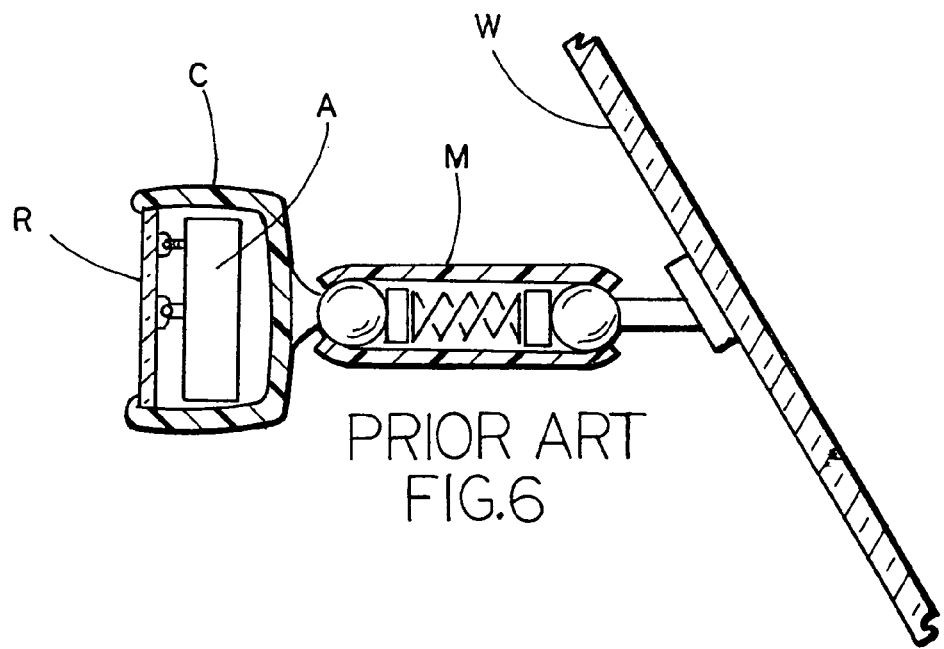
FIG. 6 is a cross-section view similar to FIGS. 3–5 of a prior art interior rearview mirror assembly of a prior art memory mirror system.

Referring to FIG. 5, a third embodiment 216 of the interior rearview mirror assembly of the present invention is illustrated. Interior rearview mirror assembly 216 includes a housing 217 and a reflective element assembly 220. Housing 217 includes a mirror casing 218 and a support or mounting member 222. Reflective element assembly 120 is supported in casing 218 by a bezel in a rearward facing opening 240 similar to the first embodiment. Casing 218 includes a first compartment or cavity 218a which is defined between an upper wall 218c, a lower wall 218d and an intermediate or back wall 218e, which extends between upper and lower walls 218c and 218d to divide casing 218 into the two compartments. Upper wall 218c, lower wall 218d and back wall 218e together form a cup-shaped casing similar to casing 18 illustrated in FIG. 2. Extending forwardly of back wall 218e is a second compartment or cavity 218b which houses an electrical actuator 226. Actuator 226 provides adjustment for casing 218 about axes X" and Y". Actuator 226 is of similar construction to actuator 26 and includes an actuator housing 228 with a pivot or ball member 230 and one or more positioning members 232 which project outwardly from housing 228 and, further, which extend and retract into housing 228 to adjust the position of casing 218, as will be more fully described below.

Casing 218 is mounted to windshield 12 by support or mounting member 222 which includes a conventional dual ball mount arrangement, as is known in the art. Mounting member 222 includes a first support member 224a, which includes a mount 224b for engaging a conventional mirror mounting button, and a ball member 224c which is engaged by a swaged, one piece tubular member 225. Mounting member 222 includes a second support member 224d which includes a second ball member 224e, similarly engaged by one piece tubular member 225. Ball members 224c and 224e are urged against the interior ends of tubular member 225 by a compression spring 225a, as is commonly known in the art. In addition, second support member 224d includes a mounting flange 224f which extends into second compartment 218b and includes a pair of sockets 234 and 238 for receiving ball member 230 and position member 232, similar to the first embodiment, which mount casing 218 onto mounting member 222. In this manner, casing 216 can be manually repositioned for rearward viewing of the vehicle about ball members 224c and 224e as well as electrically repositioned by actuator 226 about axes X" and Y".

In the illustrated embodiment, actuator 226 is mounted in casing 218 preferably on forward facing surface 218f of back wall 218e. In this manner, when actuator 226 is energized, actuator 226 pivots casing 218 and reflective element assembly 220 about mounting member 222. Furthermore, the weight of the actuator assembly 226 is distributed to mounting member 222 via flange 224f and, thus, enhances the vibration characteristics of interior rearview mirror assembly 216. In addition, interior rearview mirror assembly 216 provides ample space in compartment 218a to support a plurality of accessories and devices. It should be understood that actuator 226 may be reversed with casing 218 including a corresponding set of socket structures or back wall 218e and with actuator 226 mounted directly onto flange 224f.

It can be appreciated from the description and drawings that an improved vehicle interior rearview mirror assembly for a vehicle memory mirror system is provided that distributes the weight of the actuator to the fixed portion of the mirror assembly instead of the pivotal or moving portion of the mirror assembly and, therefore, exhibits improved vibration characteristics and, further, provides ample storage space in at least the mirror casing for housing a wide variety of accessories or devices.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow as interpreted under the principles of patent law including the doctrine of equivalents.

I claim:

1. A vehicular interior rearview mirror system, said interior rearview system comprising:
   an interior rearview mirror assembly;
   said interior rearview mirror assembly comprising a generally cup-shaped mirror casing having a reflective element, said mirror casing including a back wall, said reflective element being spaced from said back wall to thereby define a cavity for containing one or more electrical components therein;
   said interior rearview mirror assembly further comprising a support, said support being adapted to mount to a vehicle windshield or a vehicle header portion, said support being adapted to provide a break-away mounting of said interior rearview mirror assembly, said support including a cavity; and
   an electrical actuator located at least partially in said cavity of said support, said electrical actuator including at least one positioning member, said positioning member engaging said mirror casing whereby extension and retraction of said positioning member adjusts said mirror casing about one or more axes to thereby adjust said reflective element about said one or more axes in tandem with said mirror casing.

2. The vehicular interior rearview mirror system according to claim 1, wherein said support is adapted to mount said mirror assembly to the windshield.

3. The vehicular interior rearview mirror system according to claim 1, wherein said support is adapted to mount said mirror assembly to the header portion.

4. The vehicular interior rearview mirror system according to claim 1, wherein said actuator cooperates with said wall to thereby adjust the position of said mirror casing and said reflective element.

5. The vehicular interior rearview mirror system according to claim 1, wherein said support comprises a tubular member, said tubular member being adapted to mount to the vehicle windshield or the vehicle header portion.

6. The vehicular interior rearview mirror system according to claim 5, wherein said tubular member defines said cavity of said support, said mirror system comprising at least one electrical device, and said device being housed in one of said cavities.

7. The vehicular interior rearview system according to claim 1, wherein,
said adjustment of said reflective element is responsive to a memory mirror system of the vehicle.

8. The vehicular interior rearview mirror system according to claim 7, wherein said actuator is coupled to at least one control module of said memory mirror memory system.

9. The vehicular interior rearview mirror system according to claim 8, wherein said at least one control module comprises a mirror-based control module, said mirror-based control module positioned in said cavity of said support, said mirror-based control module for coupling to a vehicle-based control module of said memory mirror system.

10. The vehicular interior rearview mirror system according to claim 1, wherein said reflective element comprises a variable reflectance element.

11. The vehicular interior rearview mirror system according to claim 1, further comprising a windshield contacting rain sensor for detecting moisture on the windshield.

12. The vehicular interior rearview mirror system according to claim 11, wherein said rain sensor is located in said cavity of said support.

13. The vehicular interior rearview mirror system according to claim 1, further comprising an electronic control system, said electronic control system including a mirror based control module in said interior rearview mirror assembly, said actuator including a motor, and said mirror based control module operable to actuate said motor to adjust the position of said mirror casing and said reflective element.

14. The vehicular interior rearview mirror system according to claim 13, wherein said mirror based control module is located in said support.

15. The vehicular interior rearview mirror system according to claim 1, wherein said mirror casing includes a socket member, said socket member mounting said mirror casing to said actuator.

16. The vehicular interior rearview mirror system according to claim 15, wherein said mirror casing further comprises a second socket member, said second socket member being engaged by said positioning member to thereby adjust the position of said mirror casing about said actuator about said axes when said positioning member extends or retracts.

17. The vehicular interior rearview mirror system according to claim 1, wherein said reflective element is supported by said mirror casing.

18. The vehicular interior rearview mirror system according to claim 17, wherein said mirror casing further includes a bezel, said bezel retaining said reflective element in said mirror casing.

19. The vehicular interior rearview mirror system according to claim 1, wherein said actuator further includes a housing, said positioning member extending and retracting from said housing.

20. The vehicular interior rearview mirror system according to claim 19, wherein at least a portion of said housing forms a pivot member, said pivot member engaged with said mirror casing whereby said mirror casing pivots about said pivot member of said actuator when said positioning member is extended or retracted from said housing.

21. A vehicular memory mirror system comprising:
at least one exterior sideview mirror assembly, said sideview mirror assembly including a sideview mirror casing adapted to mount to a vehicle, a sideview reflective element, and a sideview electrical actuator for adjusting the position of said sideview reflective element in said sideview mirror casing about one or more axes;
an interior rearview mirror assembly including a rearview mirror casing, a rearview reflective element a support for mounting said rearview mirror casing to a vehicle windshield or a vehicle header, and a rearview electrical actuator, said support including a cavity, said rearview mirror casing comprising a generally cup-shaped mirror casing with a back wall, and said reflective element being spaced from said back wall to thereby define a cavity for containing one or more electrical components therein, said rearview electrical actuator being located at least partially in said cavity of said support and having at least one positioning member, said positioning member engaging said rearview mirror casing whereby extension or retraction of said positioning member adjusts the position of said rearview reflective element and said mirror casing about one or more axes about said support to thereby adjust the rearward field of view of said rearview reflective element; and
at least one control module in communication with said rearview electrical actuator and said sideview electrical actuator, said control module actuating at least one of said actuators to adjust the position of at least one of said reflective elements in response to a signal from at least one of (a) a mirror switch that is user operable to selectively position of at least one of said reflective elements and (b) a memory set switch that is user operable to set a memory position for at least one of said reflective elements.

22. The memory mirror system according to claim 21, wherein said rearview electrical actuator engages said back wall of said rearview mirror casing to thereby adjust the rearview mirror casing about said one or more axes.

23. The memory mirror system according to claim 22, wherein said positioning member engages said back wall of said rearview mirror casing to thereby pivot said rearview mirror casing.

24. The memory mirror system according to claim 21, wherein said rearview electrical actuator is supported by said support.

25. The memory mirror system according to claim 21, wherein said support is adapted to provide a break-away mounting to the windshield or the header portion of the vehicle.

26. The memory mirror system according to claim 25, wherein said control module includes at least one mirror based control module, said mirror based control module in communication with said rearview electrical actuator and actuating said rearview electrical actuator to adjust the position of said rearview reflective element.

* * * * *

UNITED STATES PATENT AND TRADEMARK OFFICE
CERTIFICATE OF CORRECTION

PATENT NO. : 7,104,663 B2　　　　　　　　　　　　　　　　　　　　Page 1 of 1
APPLICATION NO. : 10/790309
DATED : September 12, 2006
INVENTOR(S) : Peter J. Whitehead It is certified that error appears in the above-identified patent and that said Letters Patent is hereby corrected as shown below:

Column 6:
Line 41, "System" should be --system--.

Column 8:
Line 59, "Series870636" should be --Series 870636--.

Column 15:
Line 1, "PGT" should be --PCT--.
Line 1, "tiled" should be --filed--.
Line 5, "passernrer" should be --passenger--.
Line 23, Delete --,-- after "International".

Column 16:
Line 18, "maimer" should be --manner--.
Line 28, "co-pendiiig" should be --co-pending--.
Line 33, "entirely" should be --entirety--.

Column 19:
Line 14, Claim 7, Insert --mirror-- after "rearview".
Line 15, Claim 7, delete --,-- after "wherein".

Signed and Sealed this

Thirteenth Day of February, 2007

JON W. DUDAS
*Director of the United States Patent and Trademark Office*